US006675949B1

(12) United States Patent
Gonzalez Alemany et al.

(10) Patent No.: US 6,675,949 B1
(45) Date of Patent: Jan. 13, 2004

(54) ACCELERATING WALKWAY

(75) Inventors: Miguel Angel Gonzalez Alemany, La Fresneda (ES); Juan Domingo Gonzalez Pantiga, Gijon (ES); José Esteban Fernandez Rico, Gijon (ES); José Manuel Sierra Velasco, Gijon (ES); Ricardo Vijande Díaz, Gijon (ES)

(73) Assignee: Thyssen Norte, SA (ES)

( * ) Notice: Subject to any disclaimer, the term of this patent is extended or adjusted under 35 U.S.C. 154(b) by 13 days.

(21) Appl. No.: 10/130,126

(22) PCT Filed: Nov. 17, 2000

(86) PCT No.: PCT/ES00/00443

§ 371 (c)(1),
(2), (4) Date: May 14, 2002

(87) PCT Pub. No.: WO01/36311

PCT Pub. Date: May 25, 2001

(30) Foreign Application Priority Data

Nov. 19, 1999 (ES) ............................................ 9902555

(51) Int. Cl.[7] ............................................ B65G 21/12
(52) U.S. Cl. ............................................ 198/334
(58) Field of Search ......................................... 198/334

(56) References Cited

U.S. PATENT DOCUMENTS 3,672,484 A 6/1972 Angioletti et al.
3,908,811 A 9/1975 Castoldi et al.
3,939,959 A * 2/1976 Dunstan et al. ............. 198/334
4,066,161 A * 1/1978 Michalon et al. ........... 198/334
4,197,933 A * 4/1980 Dunstan et al. ............. 198/334
4,276,976 A 7/1981 Dunstan et al.
4,284,191 A * 8/1981 Lavau ........................ 198/344
5,571,254 A 11/1996 Saeki et al. ................. 198/334

FOREIGN PATENT DOCUMENTS

EP 0646538 A2 9/1994
EP 0773182 A2 5/1997
EP 0831052 A1 3/1998
EP 0850870 A1 7/1998
EP 0854108 A1 7/1998
FR 2638727 * 5/1990 ................. 198/334
FR 2747664 10/1997
GB 1383785 * 2/1975 ................. 198/334
GB 2025879 A 1/1980
GB 2264686 A 9/1993
GB 2310185 8/1997
JP 6-152087 * 6/1991 ................. 198/334

OTHER PUBLICATIONS

Patent Abstracts of Japan vol. 1996, No. 07, Jul. 31, 1996. & JP 08 061435 A (Matsui Akira), Mar. 8, 1996.

* cited by examiner

*Primary Examiner*—James R. Bidwell
(74) *Attorney, Agent, or Firm*—Ostrolenk, Faber, Gerb & Soffen, LLP

(57) ABSTRACT

An accelerated walkway having a moving surface made up of sets of treadboards of variable length which are mounted between lateral traction chains. A drive mechanism is related with the lateral traction chains. Each set of treadboards has a front treadboard and a rear treadboard that are grooved and mutually articulated along an axis perpendicular to the direction of movement. The rear treadboard of each set of treadboards is mounted on the lateral traction chains and on lateral guidance rails. The front treadboard of each set of treadboards rests on and is displaceable over the rear treadboard of a next set of treadboards in the direction of movement by guide elements. Each of the lateral traction chains includes elbowed links and straight links consecutively articulated to each other through their extremities and run between lateral guides that cause the links to swivel between a folded position, in which the length of the chain is reduced, resulting in the partial overlaying of the treadboards, and a maximum extension position, resulting in the positioning of the treadboards in coplanar alignment.

11 Claims, 18 Drawing Sheets

ACCELERATING WALKWAY

The present invention refers to an accelerated walkway for conveying passengers or materials, which provides major improvements in the ease of use, in its requirements for space necessary for implementation and in the simplicity of its mechanisms.

Different systems are already known for obtaining variable speed walkways intended for conveying passengers or materials, among which can be mentioned, as the most important, the following:

1. Variable speed walkway consisting of various rubber bands which are turned at constant speed. The rubber bands at the extremities turn at a slower speed, and the rubber band in the centre turns at a higher speed, whereby a slow speed is achieved at the entrance and at the exit. Walkways with such characteristics are described in the patents EP 0854108 A-1, EP 0850870 A-1 and EP 00773,182 A-2.

2. Variable speed walkway consisting of telescopic treadboards. In this solution the variation in speed is achieved by separating some conveyor treadboards from others. The gap that would be produced is covered by some plates which initially are hidden below the surface of the adjacent treadboard. A walkway with these characteristics is described in the patent GB 2264686 A.

3. Variable speed walkway consisting of parallelepipedal treadboards which are displaced laterally with respect to each other. The variation in speed is achieved by changing the direction of movement, maintaining the projection of the velocity constant over the entrance and exit direction. This walkway has a characteristic S-shape. Walkways with these characteristics are described in the U.S. Pat. No. 5,571,254 and in the EP 0646538 A2.

4. Variable speed walkway constituted by a set of interconnected motor-driven grooved rollers. The rollers are of reduced diameter, achieving in this way that the working surface is approximately flat. The variation in speed is achieved by making some rollers turn faster than others. In a variation of this walkway these roller are employed only in accelerating and retarding portions. The portions of constant speed are implemented by means of rubber bands similar to those presently used for conveying passengers, as is described in the FR 2747664 A1.

5. Variable speed walkway consisting of a deformable rubber band. This endless band would be capable of elongation in the centre portion and of widening for entrance and exit, thereby achieving the variation in speed, as is described in the EP 0831052 A1.

6. Variable speed walkway consisting of an endless worm of overlapping treadboards. The variation in speed is achieved by the displacement of some treadboards with respect to others, as is described in the GB 2025872.

The walkway of the invention is made up of sets of treadboards of variable length which are mounted on lateral traction chains, with which is related a drive mechanism, in a form similar to that of system 6 described above.

Compared with these systems the walkway of the invention is characterised in that each set of treadboards comprises a front and rear treadboard, slotted and mutually articulated along an axis perpendicular to the direction of movement.

Of the two treadboards that make up each set of treadboards, the rear treadboard is mounted on the lateral traction chains and also on lateral guidance rails. For its part, the front treadboard rests on and can be displaced over the rear treadboard corresponding to the set of treadboards which is situated immediately in front, by means of guide elements.

According to another characteristic of the invention, each of the side chains is constituted on a basis of links consecutively articulated to each other through their extremities. The links in the chains can all have an elbowed shape or include elbowed links and straight links. In any case one of the straight spans of the elbowed links is articulated at its extremities with the adjacent links, be they straight or elbowed.

The chains mentioned run between lateral guides that cause the links, be they straight or elbowed, to swivel between a folded position, in which the length of the chain is reduced, resulting in the partial overlaying of the treadboards that form the walkway, and a maximum extension position, in which the chain reaches its maximum length and produces the positioning of the treadboards in coplanar alignment. It is in this position of maximum extension that the links can come to be in alignment with the span of elbowed links with which they are articulated.

The swivelling of the links takes place in a progressive manner between the centre span of the chains and the outermost spans thereof, whereby a variation in speed is achieved of the displacement on the surface defined by the treadboards, this speed being maximum in the centre span and minimum in the outermost spans. In the outermost span an acceleration and retardation occur in correspondence with the start or the entrance portion and the end or the exit portion of the chain, respectively.

The walkway is completed with drive equipment or elements for the two chains that carry in traction the treadboards, a supporting frame, two side balustrades similar to those of conventional constant speed walkways, handrails, fixed treadboards in the entrance and exit portions and the electrical and safety components and elements necessary for the correct operation of the walkway, all of which have a constitution and disposition which are known.

In each treadboard assembly, the rear treadboard is fitted on each of its sides with longitudinal guides, with two rear coaxial rollers that form part of the lateral traction chains, and with front coaxial rollers which can move over the side guidance elements. The front treadboard, of each set of treadboards, has for its part on each of the sides, front coaxial sliding or rolling elements, which can move over the guides of the rear treadboard corresponding to the set of treadboards situated immediately in front.

The support of the chains of the side guidance elements is produced through the elbowed links, by means of rolling elements with axle perpendicular to the link. These rolling elements shall preferentially coincide with articulations between the links of the chain.

The two treadboards of each set of treadboards have complementary adjacent edges which are coupled to each other in the coplanar position of these treadboards.

In the centre portion of the walkway, where the chains run in the maximum extension position, the treadboards of the different sets occupy coplanar positions. In the outermost portions, where the chains run in the position of maximum folding, the rear treadboards of the different sets run under the front treadboards, these front treadboards being in a horizontal position, with the adjacent edges coupled to each other. In any of the positions described, the axle of the rolling or sliding elements of these front treadboards coincides with the line of intersection of the parallel planes equidistant from the respective walking surfaces of the front sub-treadboard and the adjacent rear one.

When the transition occurs between portions of maximum extension and portions of maximum folding of the chain, the overlapping between front and rear treadboards varies progressively, the front treadboards being maintained in a noticeably horizontal position and the rear treadboards at a slight inclination, in opposition to the direction of movement.

In the entrance and exit portions, the front treadboards of the sets of treadboards move in a coplanar and aligned manner, the transition with the fixed surface of the walkway occurring by means of a system of combs.

The traction chains can be engaged at their outermost points with auxiliary pinions or chains that maintain the distance between the links and also facilitate the tilting of the treadboards between the forward-going and backward-going segment of the assembly. At least one of these auxiliary pinions or chains can be in relation with the drive mechanism.

All the characteristics stated, as well as others proper to the invention and the operation of the walkway shall be explained below in greater detail, with the help of the attached drawings, in which a non-restrictive example of embodiment is shown.

Figure 1:
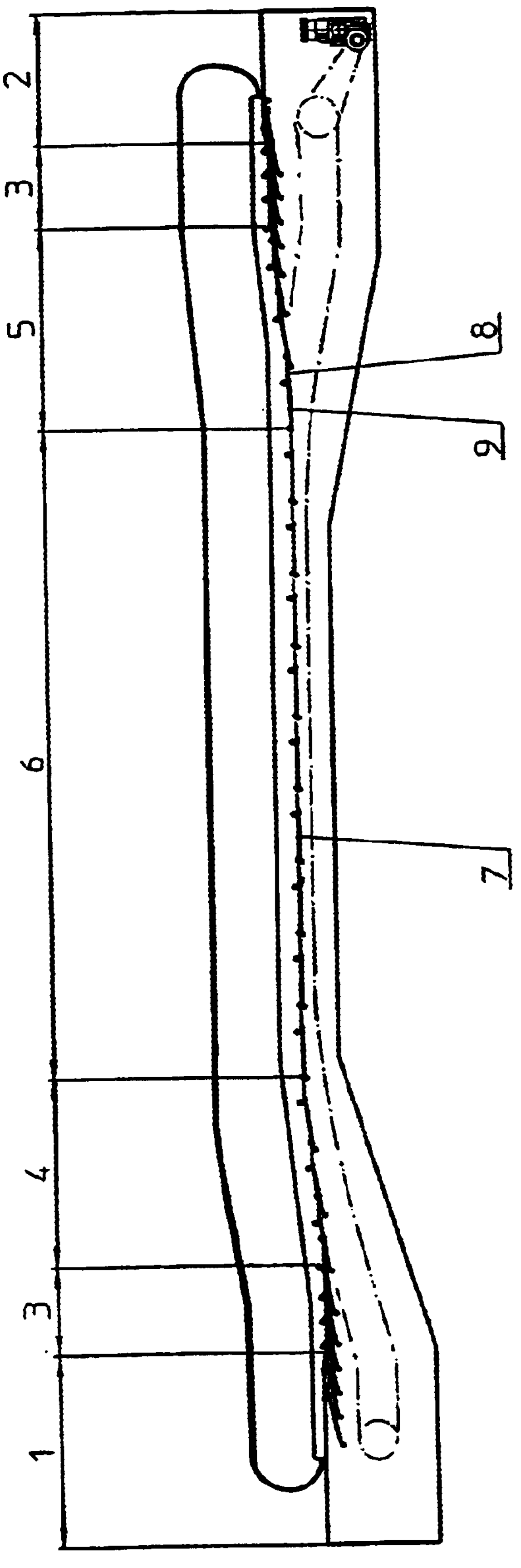
FIG. 1 is a side elevation in schematic form of an accelerated walkway constituted in accordance with the invention.

In FIG. 1 is shown in schematic form, in a side view, an accelerated walkway which includes outermost portions for entrance (1) and exit (2), followed by slow speed portions, with reference number 3, inside which runs and accelerating portion 4 and a retarding portion 5, next to the entrance and exit respectively, and between which runs an intermediate, high speed portion 6.

The movable surface 7 of the walkway is comprised of sets of treadboards, each set formed by a front treadboard 8 and another rear treadboard 9, FIGS. 7 to 11, grooved and of different length, and the treadboards are articulated to each other along an axis perpendicular to the direction of movement.

Figure 15:
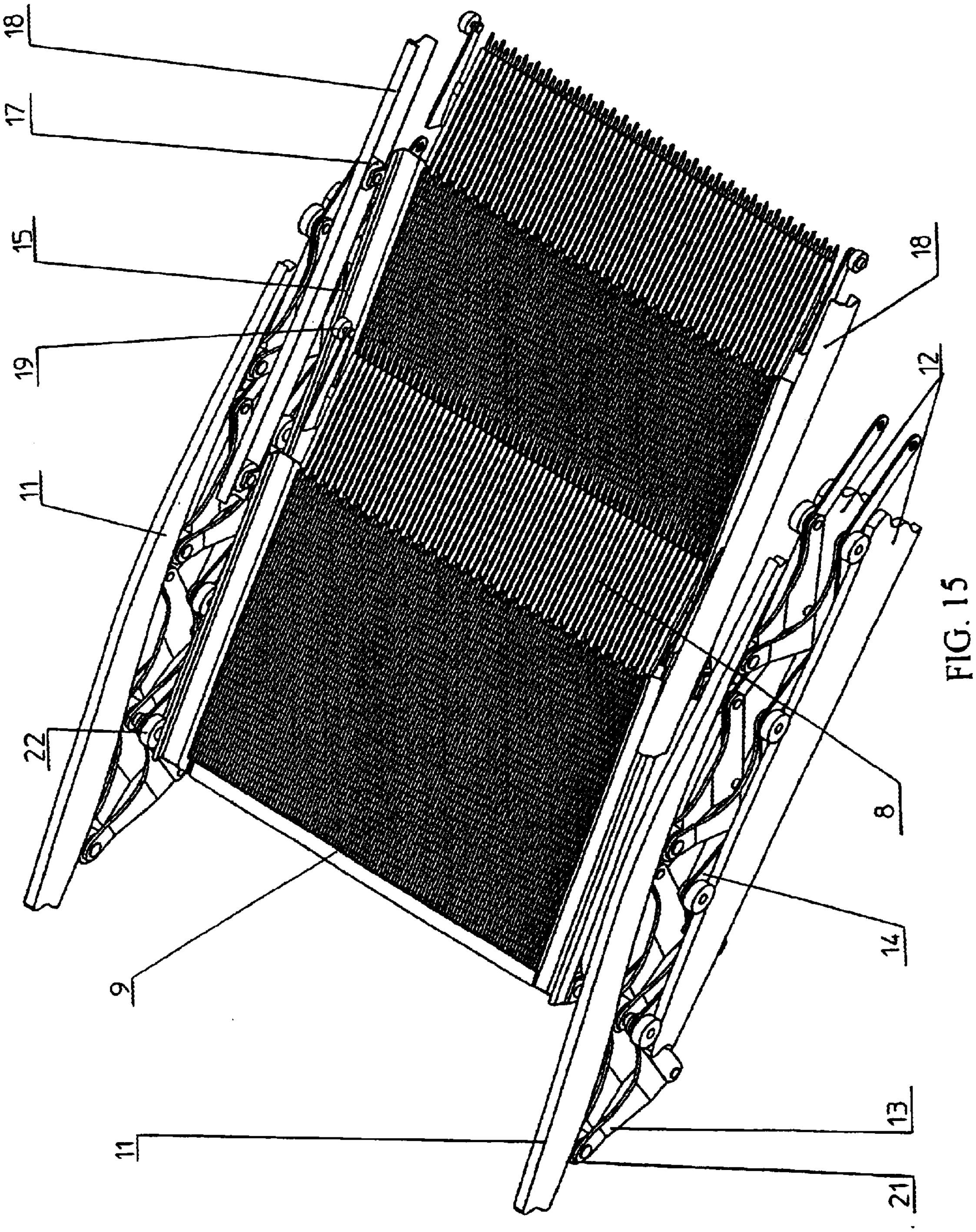
FIG. 15 shows in perspective a series of treadboards and adjacent chain spans, with the pertinent guides, in the position they adopt in the accelerating and retarding portions.

The rear treadboard 9 of each set of treadboards is mounted on two lateral traction chains 10 and on side guidance elements 11 and 12, FIG. 15.

Figure 4:
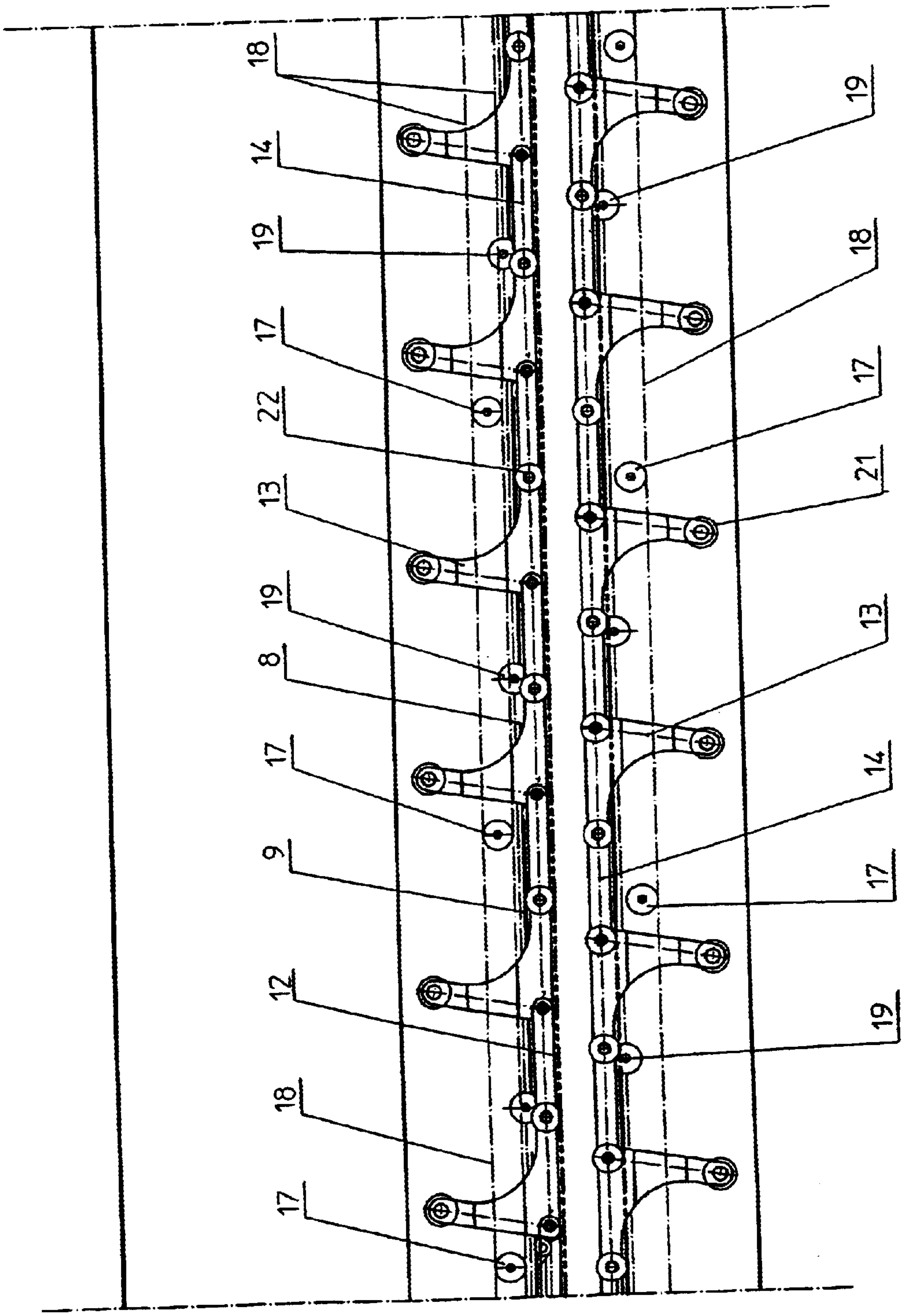
FIG. 4 is a side view in schematic form of the maximum speed portion of the accelerated walkway, on a larger scale.
Figure 5:
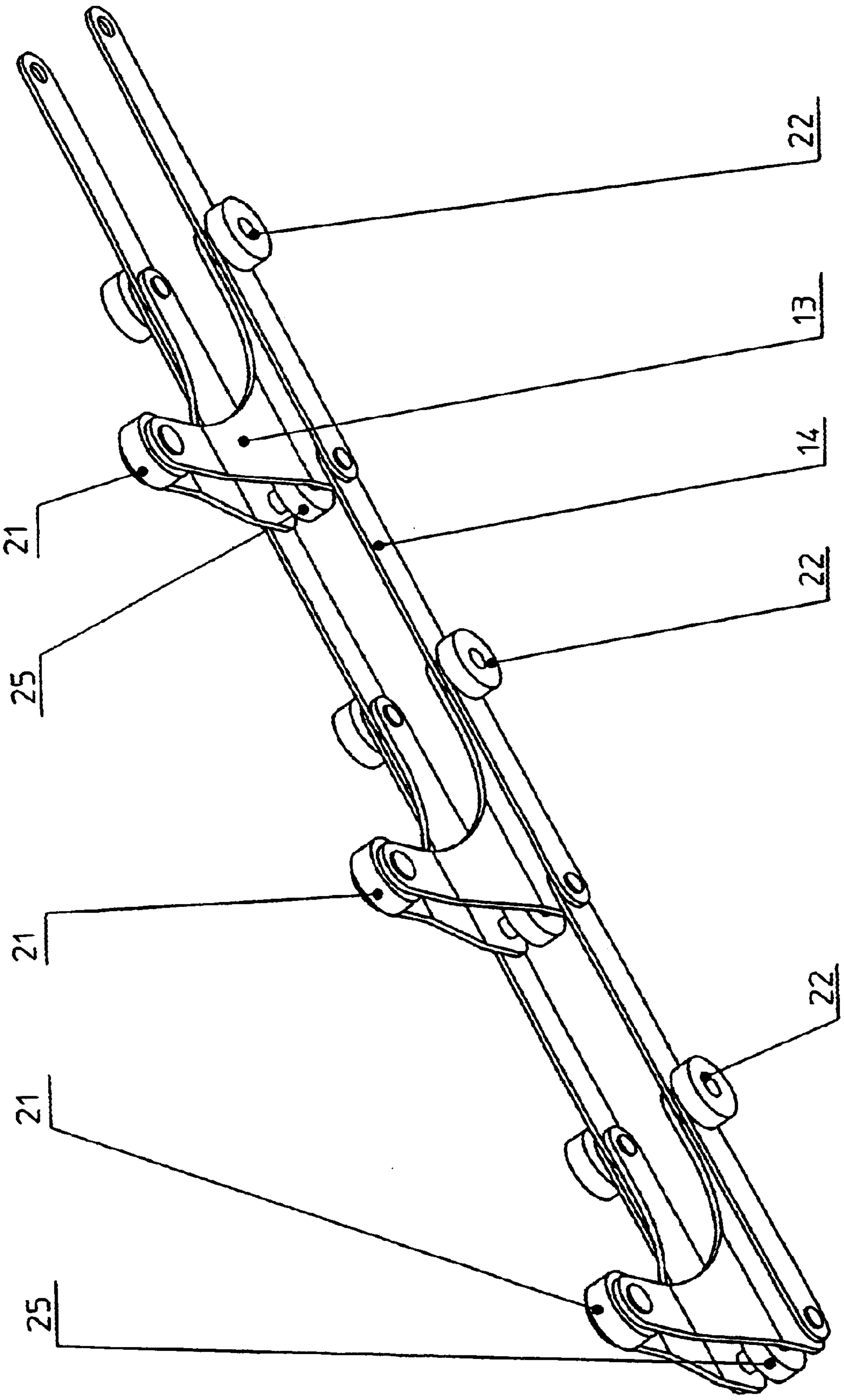
FIG. 5 is a side view in perspective of a span of the traction chain, in the portion of maximum speed.
Figure 6:
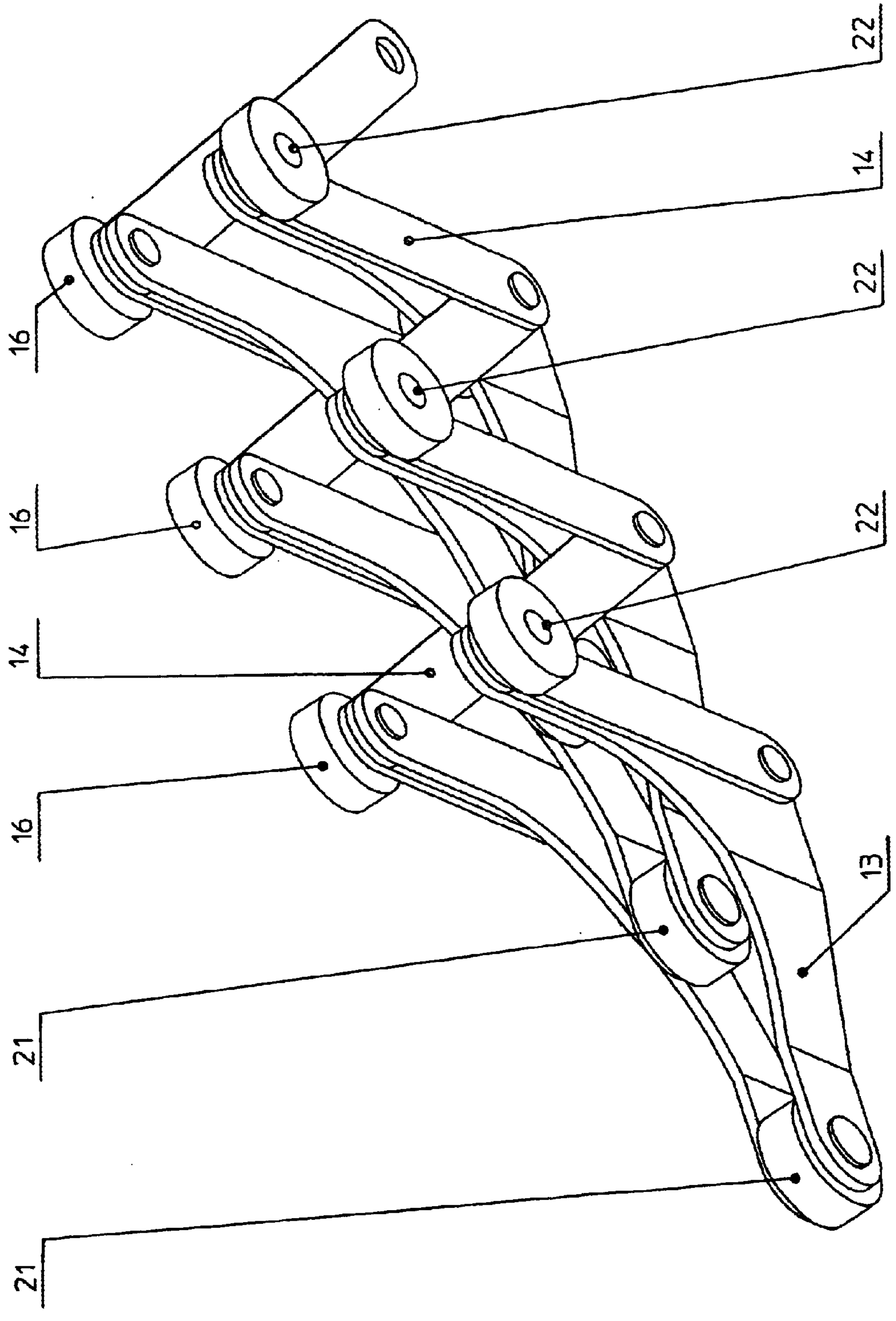
FIG. 6 is a side view in perspective of a span of the chain, in the portion of minimum speed.

The chains 10, as can be seen in FIGS. 4 to 6, are formed in the example described by elbowed links 13 and straight links 14 arranged in alternate positions with respect to each other. However the chain could have another formation, for example on a base of elbowed links only or include a greater number of straight links between consecutive elbowed links.

Each elbowed link 13 is articulated, through the end of one of its straight segments, with the adjacent links, be they straight or elbowed.

As can be appreciated from FIGS. 7 to 11, the rear treadboard 9 of each set of treadboards, has on each of its sides longitudinal guides 15 and two rear coaxial rollers with reference number 16, which form part of the side chains 10. These rear treadboard also have on each of their sides front coaxial rolling elements 17 which are run on lateral guides 18, FIGS. 2, 3 and 15.

Returning to FIGS. 7 to 11, the front treadboard 8 of each set of treadboards has on each of its sides sliding or rolling elements capable of moving over the lateral guides 15 of the rear treadboard corresponding to the set of treadboards located immediately in front, as can be clearly appreciated from FIGS. 9 and 10.

The elbowed links 13 rest on the side guides 11 and 12 through rollers 21 and 22 having axle perpendicular to the link and situated at the outermost points of the segments of elbowed links 13.

Figure 2:
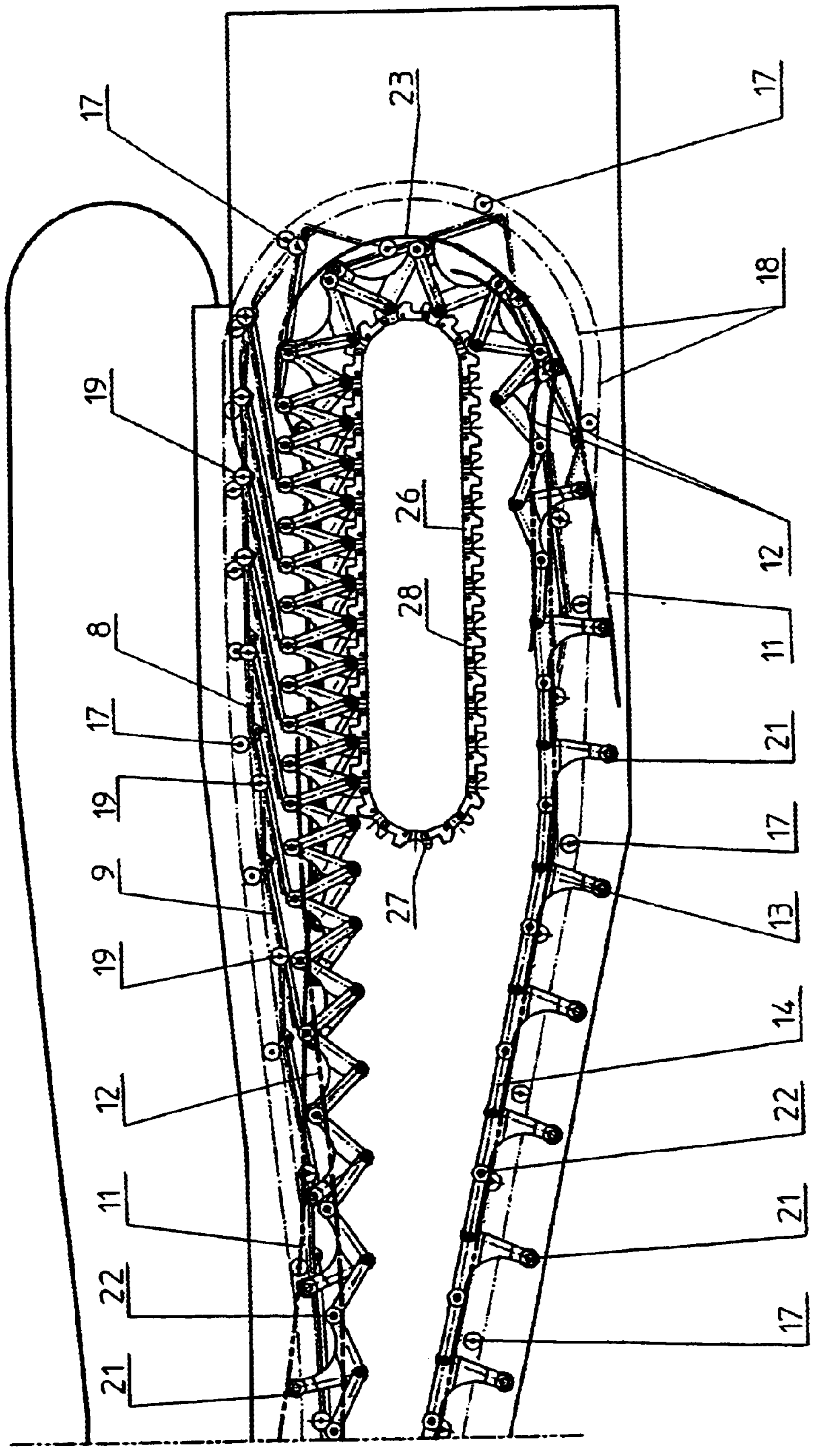
FIG. 2 is a side view in schematic form of the exit portion of the walkway of FIG. 1, on a larger scale.
Figure 3:
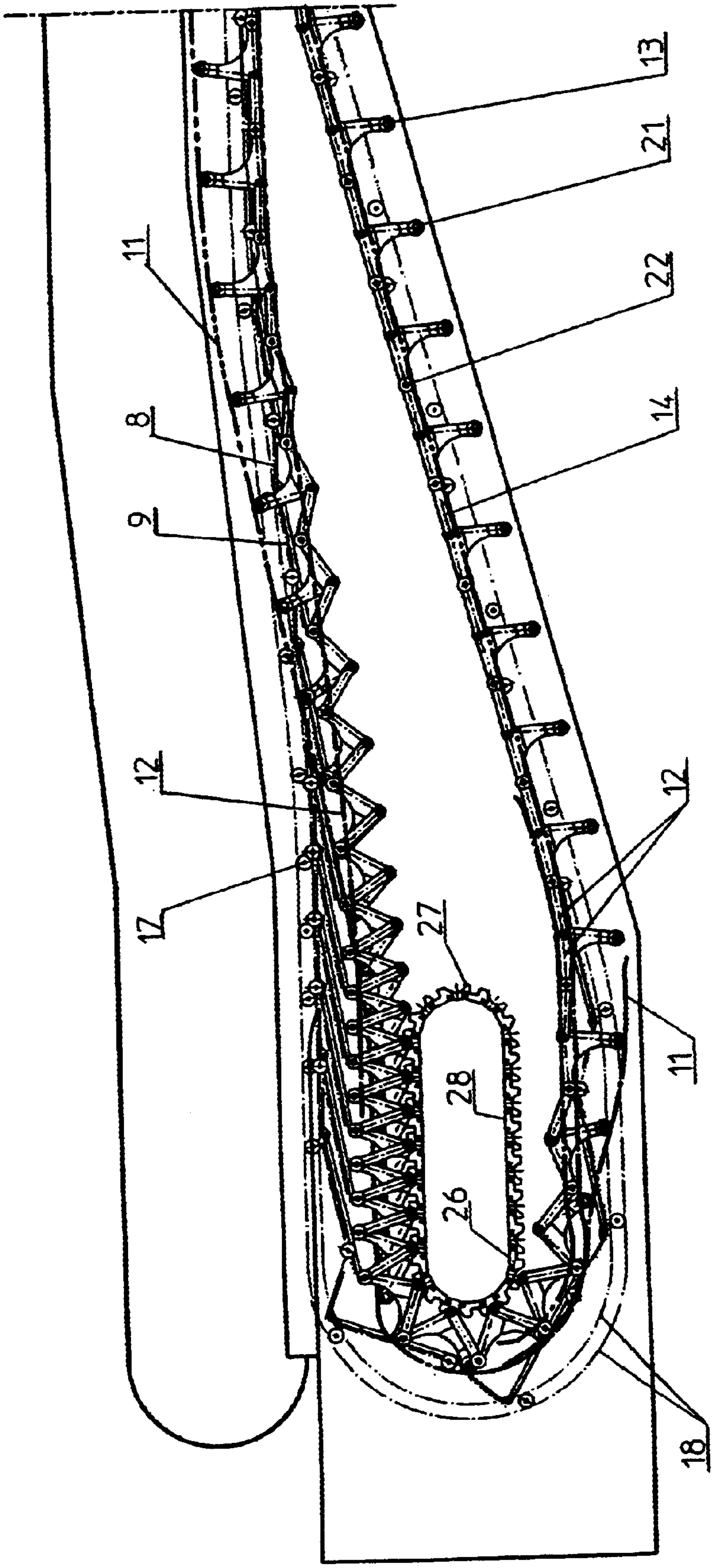
FIG. 3 is a side view in schematic form of the entrance portion of the accelerated walkway of FIG. 1, on a larger scale.

In FIGS. 2 and 3 it can be appreciated how the guide 11 assists in the change of direction in the movement of the chain.

Figure 7:
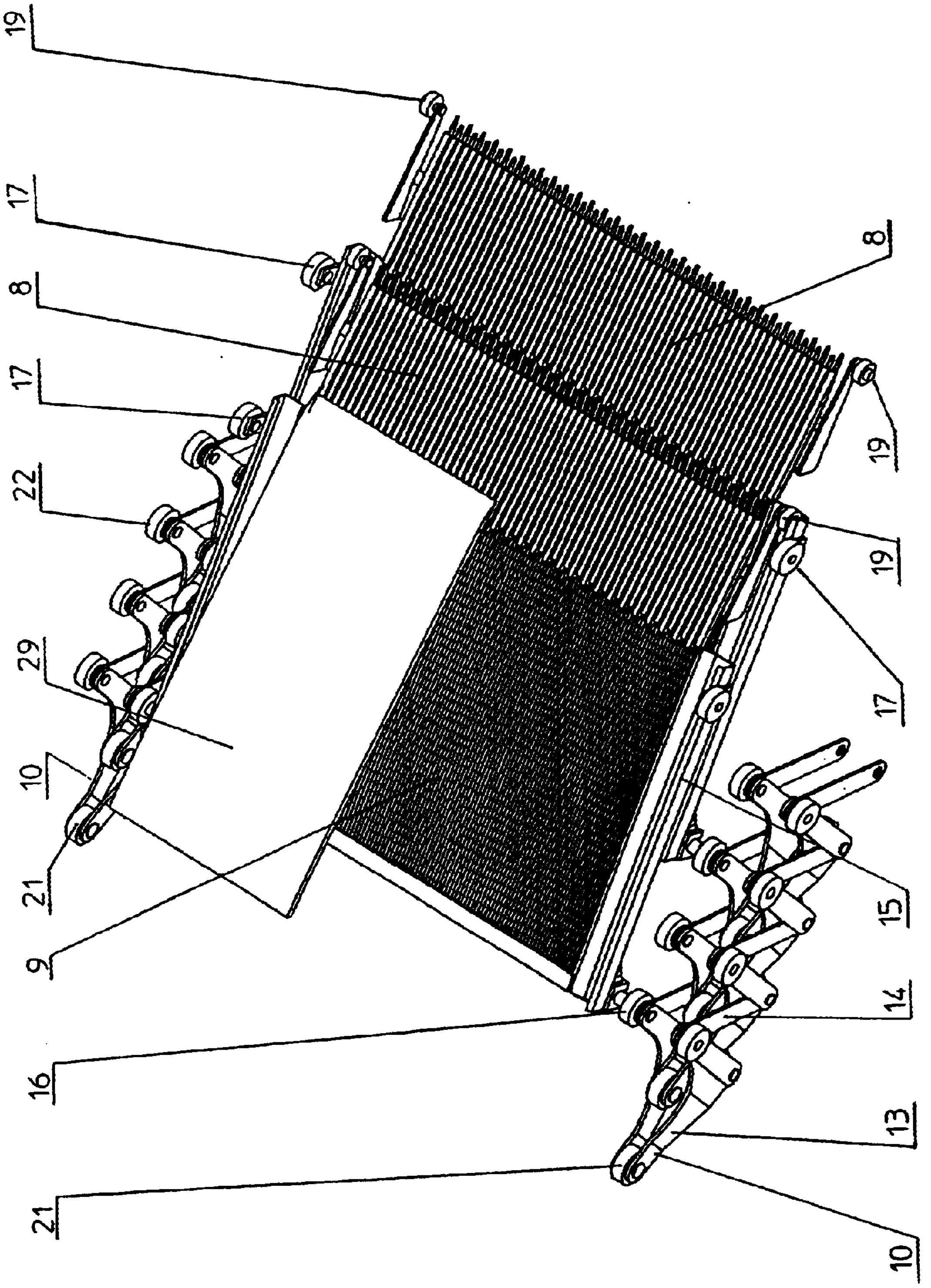
FIG. 7 shows in perspective a series of treadboards and adjacent chain spans, in the position they adopt in the slow speed portion.
Figure 9:
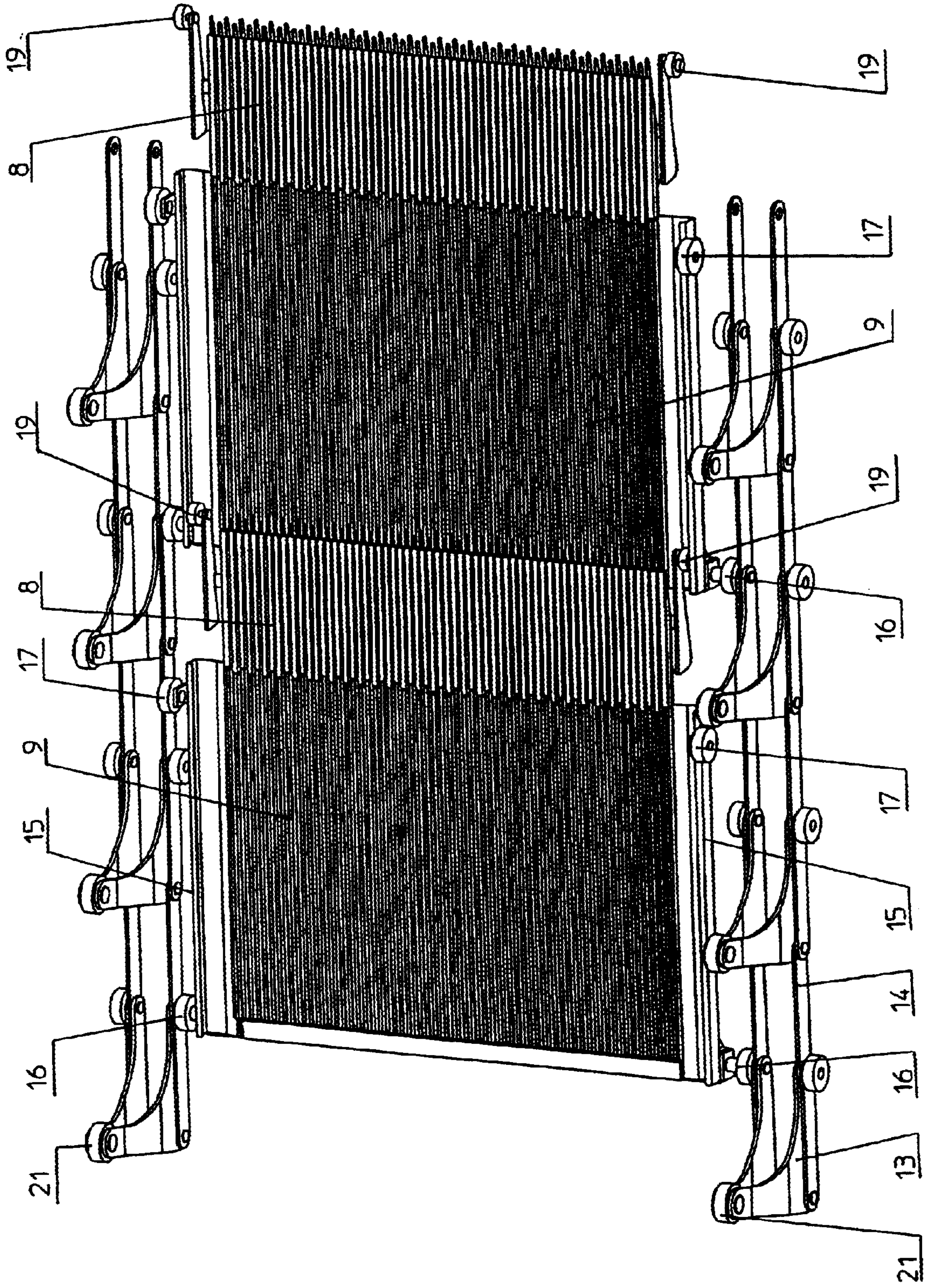
FIG. 9 shows a view in perspective of a series of treadboards with the adjacent chain spans, in the position they adopt in the high speed portion.

The rolling elements 21 and 22 of the elbowed links, by resting on the guides 11 and 12, produce the swivelling of the totality of the links, both elbowed and straight, between a position of being folded, which coincides with the end of the walkway 1, 2 and 3 and is shown in FIGS. 6 and 7, in which the length of the chain is reduced and the partial overlapping of the treadboards 8 and 9, and a position of maximum extension, which corresponds to the high speed portion 6 of the walkway, FIG. 1, and is shown in FIGS. 4, 5 and 9, in which the chain attains its maximum length, in order to produce the positioning of the treadboards 8 and 9 in coplanar alignment.

Figure 11:
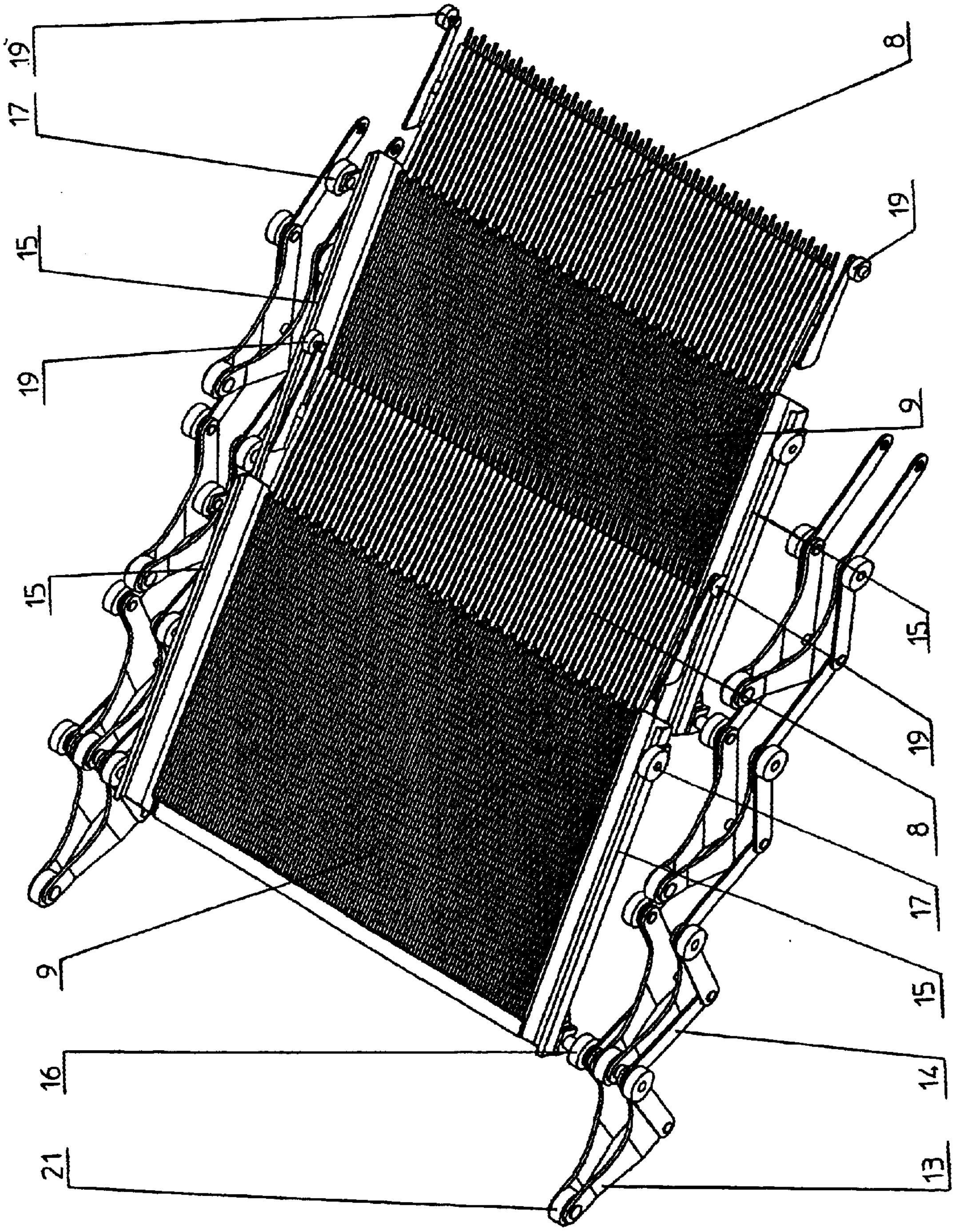
FIG. 11 shows in perspective a series of treadboards and adjacent chain spans, in the position they adopt in the accelerating and retarding portions.

The swivelling of the links takes place progressively in portions 4 and 5, FIG. 1, originating a variation in speed of displacement on the surface defined by the treadboards 8 and 9. FIGS. 11 and 15 show an intermediate position of the treadboards 7 within the accelerating or retarding portions.

Figure 10:
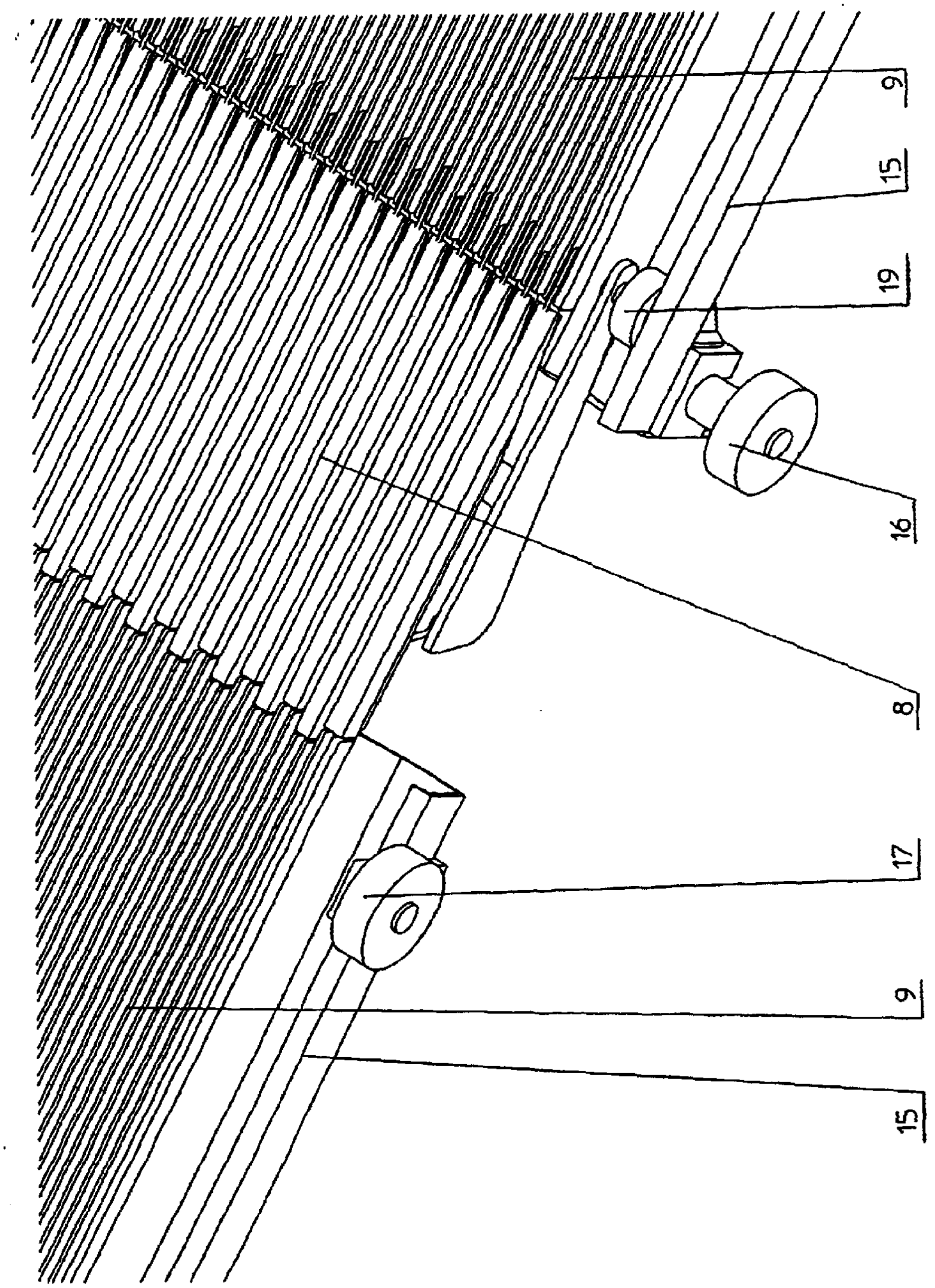
FIG. 10 is a detail of FIG. 9, on a larger scale and suppressing the side chains, at the transition between two consecutive treadboards.

As can be appreciated from FIG. 10, the two treadboards 8 and 9 of each set have complementary adjacent edges, able to couple with each other in the coplanar position of said treadboards.

As can be better seen in FIG. 5, the chains 10 also have rollers 25, coincident with the elbow of the elbowed links with which a chain 26 engages, FIG. 2, which maintains the spacing of the different elements in the slow speed portion, reducing the stress that has to be withstood by chains 10 and so facilitating the turning of the treadboards between the lower path and the working path. The chain 26 is constituted by two types of link 27 and 28, FIG. 12, of profile suitable for the diameter of the wheel 25 of the elbowed links with which it has to engage. This drawing corresponds with a preferred embodiment, though equally possible are other configurations in which this caterpillar chain 26 is not present.

Figure 12:
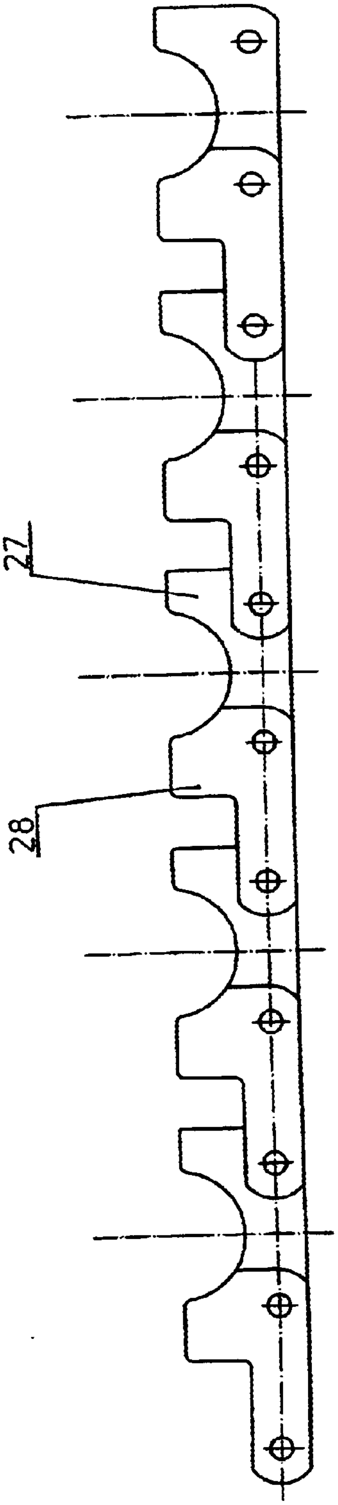
FIG. 12 is side view of a span of an auxiliary chain which engages with the traction chains.

In addition to the embodiment shown in FIG. 12, other different embodiments are possible for the caterpillar chain 26, as a function of the pitch of the main chain, the speed ratio to be attained, and the diameter of the wheel to be engaged.

The chain 26 can engage in turn in two pinions not shown and the meshing between this chain 26 and the chains 10 is assured by means of some internal guides on said chain 26. In the accelerating portion of the chains 10 the chain 25 no longer engages with them and the position of the links shall be determined by the guides 11 and 12.

In the centre part of the walkway, the treadboards 8 and 9 run at maximum speed, and the chains 10 are in their most extended position, as can be seen in FIG. 4. If necessary, additional units for power transmission shall be included which are synchronised with the main unit which shall go in the exit portion. These units can consist of caterpillar type traction chains, similar to those described for the entrance and exit portion of the FIGS. 2 and 3, but having their geometry adapted to the position of the main chains in this portion.

The guides 11 and 12, in the entrance portion of FIG. 3, produce the gradual unfolding of the links, whilst in the exit portion of FIG. 2, they produce the gradual folding thereof.

As has already been indicated, the guides 11 and 12, together with guide 18, serve to define the relative position of the links and for guidance in the change in direction of circulation of the chain and treadboards.

The chain 26 can produce the traction of the treadboard assembly through a motorised reduction-gear unit which transmits its power to said chain.

Figure 13:
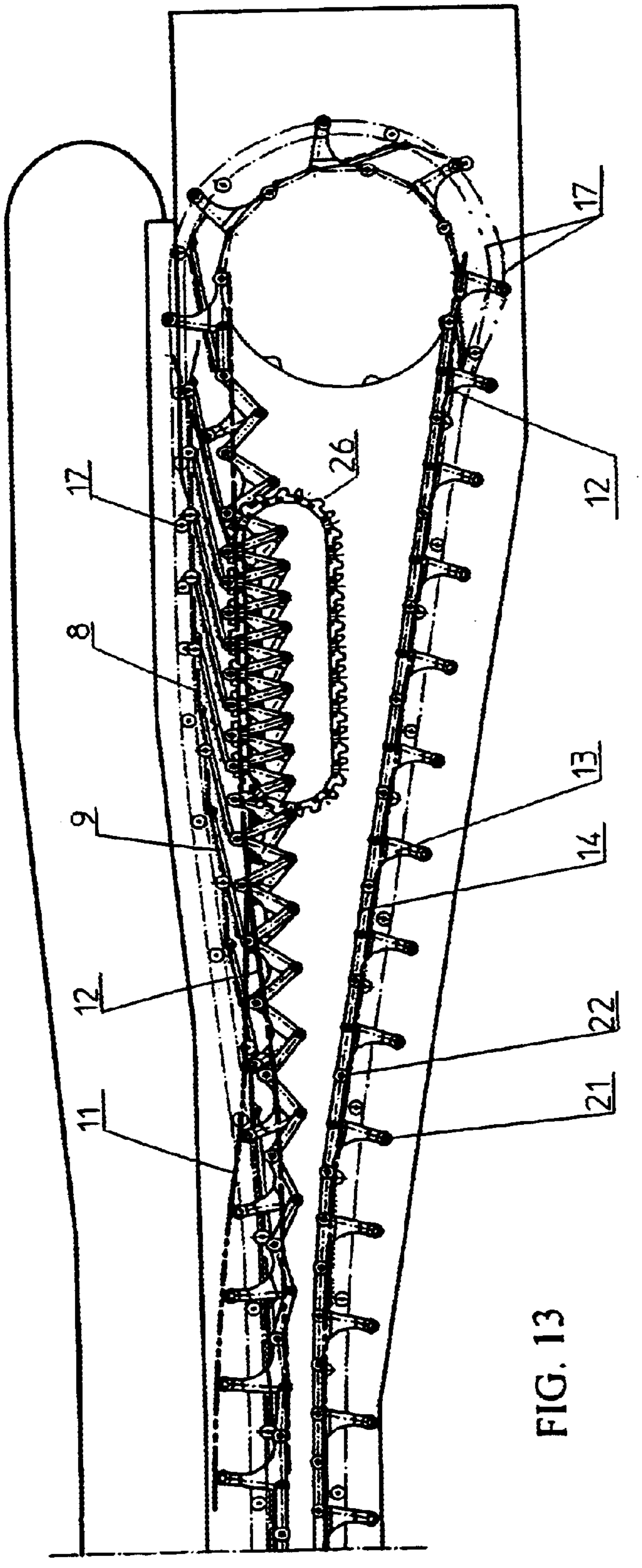
FIG. 13 is a side elevation in schematic form of the exit portion of the accelerated walkway, showing a possible pulling or traction mechanism.
Figure 14:
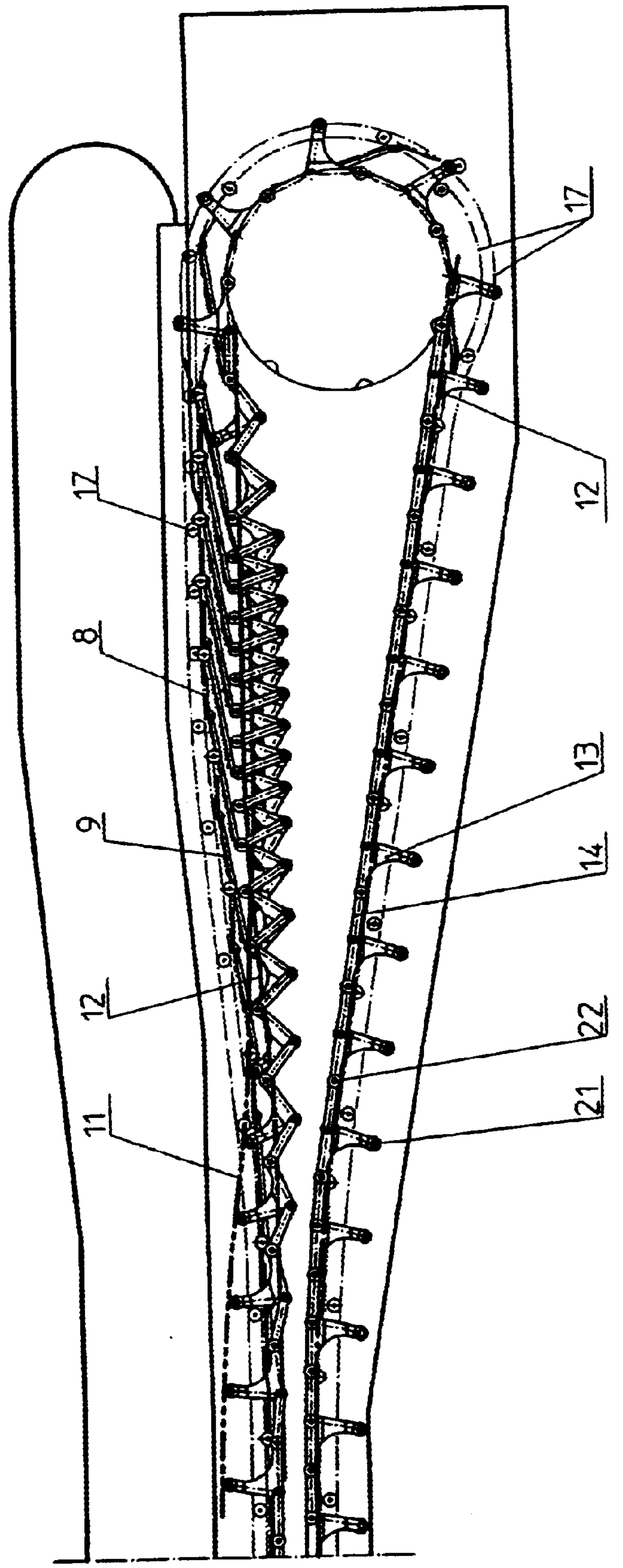
FIG. 14 is a side elevation in schematic form of the exit portion of the accelerated walkway, showing a variant in the implementation of the traction system.

In FIGS. 13 and 14 other possible solutions are shown for producing the traction of the main chains 10. In FIG. 14 treadboards 8 and 9 once the transition has taken place with the fixed part of the walkway. The main chains 10 mesh with toothed wheels 29 at maximum speed. In FIG. 13 this system is combined with the caterpillar type chain 26 system.

The chains 10 present in the minimum speed portion the minimum angle between the different links. FIG. 6 shows a detail in perspective of the chain folded into this position.

Figure 8:
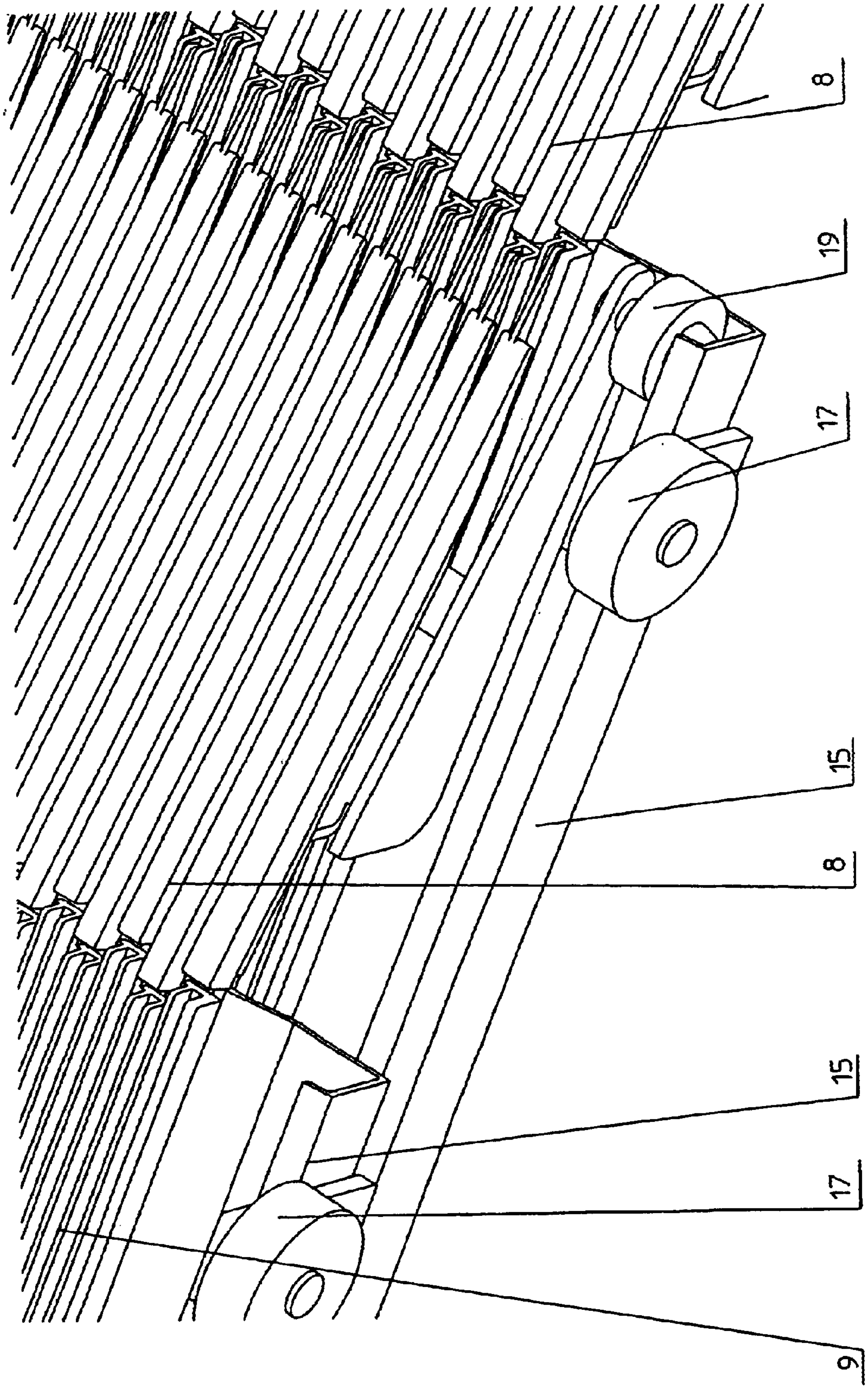
FIG. 8 is a detail of FIG. 7, on a larger scale, at the transition between two consecutive treadboards.

In the entrance and exit portions, treadboards 8 and 9 travel at low speed, for which reason the rectangular treadboards 9 are covered by the comb-shaped treadboards 8, FIG. 7. The walking surface of the comb-shaped treadboards 8 is flat and grooved to achieve a secure transition between the fixed entrance and exit treadboards and the moving treadboards of the walkway. In FIGS. 7 and 8 can be seen details of the treadboards in these slow speed portions. In particular, it is possible to see the extremities of the grooved treadboards 8, which engage in the extremities of the following treadboards. It is also possible to view the position of the supporting wheels 19 of the treadboard 8 on the inside of the guides 15 of the treadboard 9 which follows, with the axle coincident with the intersection of two planes parallel to and equidistant from the respective walking surfaces of the adjacent preceding and ensuing treadboards. In FIG. 7 the transition is also seen between the fixed part of the walkway 29 and the moving treadboards with a system of combs similar to that to be found in constant speed walkways.

In FIGS. 9 and 10 are shown details of the treadboards 8 and 9 in the maximum speed portion, together with the chains. The grooves at the extremities of the treadboards engage with the grooves at the extremities of the ensuing treadboard, practically eliminating the risk of accidents due to catching, trapping, pinching, etc.

FIG. 11 shows a detail of the treadboards in the portions of transition between those of minimum speed and those of maximum speed, that is in the portions of accelerating and retarding. In these portions the movements take place maintaining the comb-shaped treadboards 8 horizontal, hence in both portions there is a slight increase in slope.

As already mentioned, the walkway shall also include a support structure for all elements, side balustrades adapted to the form of the walkway, electrical and safety fittings suitable for the operation of the walkway and side handrails with ancillary drive systems, which shall move practically at the same speed as the neighbouring treadboards.

In the operation of the walkway, treadboards 8 and 9, after covering a distance at slow speed, in entrance portion 1, FIG. 1, start to accelerate and therefore separate from each other. The gaps which are formed between the treadboards 8 are covered by treadboards 9. In the preferred configuration, this movement occurs without varying the angle existing between each set of treadboards 8 and 9, thus treadboards 8 can always remain parallel to the horizontal plane and treadboards 9 at a determined angle with respect to them. In this manner a slight change in level would be produced between the slow speed portion and the maximum speed portion, shown with reference number 6 in FIG. 1. To achieve this movement, the projection of the speed on the direction perpendicular to the slotted surface of the treadboards 9 must remain constant. In the last stage of the acceleration, treadboards 9 rotate about the pin which joins them to treadboards 8. In the acceleration portion 4, chains 10 unfold until they are completely extended in the high speed portion 6, all of which can be appreciated in FIG. 3. In the acceleration portion, it is also possible to have a configuration in which there is no variation in slope. In that case, the angles between treadboards 8 and 9 shall vary in order to ensure the covering of the gaps that would be produced by the relative displacement of the treadboards.

Thanks to the position of the lateral rollers 19 which support the treadboards 8 and to the position of the guides 15 of the treadboards 9, in the maximum speed portion all treadboards are located in the same plane, and a completely smooth working surface is achieved. For this, the axle of the supporting rollers 19 must coincide with the intersection of two planes parallel to and equidistant from the walking surfaces of treadboards 8 and 9 and the guides 15 which come joined to the treadboards 9 must be accelerated parallel to the slotting thereof. This characteristic is an important advantage of this walkway with respect to other previous solutions.

When approaching the exit portion 2, FIG. 1, the treadboards enter a retarding portion 5 in which the opposite movement takes place to that described for the accelerating portion. In the preferred configuration treadboards 8 and 9 again climb a small slope until the slow speed exit portion is reached. The position of the surfaces on which the user can tread is horizontal, on the treadboards 8, or sloping in the opposite direction to the motion on treadboards 9, whereby the stability of the user experiencing the deceleration is enhanced. This constitutes a major advance with respect to the state of the art. In the slow speed portion 3, close to the exit, treadboards 8 and 9 are moved horizontally at slow speed. The user only sees the comb-shaped treadboards 8, the rectangular treadboards 9 being hidden below them. In this portion the chain recovers its fully folded condition, as can be appreciated in FIGS. 2, 13 and 14.

In the configuration of the walkway of the invention, the transition between the moving treadboards and the fixed portion for entrance and exit is done with a comb system similar to that employed in constant speed walkways, as shown in FIG. 7.

The insertion of the elbowed links in the traction chains means that the folding forces are small. These elbowed links have rolling elements positioned at two points such that the forces applied by the guides 11 and 12 upon them produce a turning couple in the link. In this manner the forces necessary for folding the chain are reduced, with respect to other solutions known, which signifies a major advantage from the point of view of performance of the installation and of the maximum reduction in speed that can be achieved with the mechanism.

As well as the caterpillar type chain drive systems, other solutions can be employed, such as traditional high-speed traction systems or a mix of both systems. In these solutions, the treadboards would accelerate after passing the transition with the fixed part of the walkway.

Figure 16:
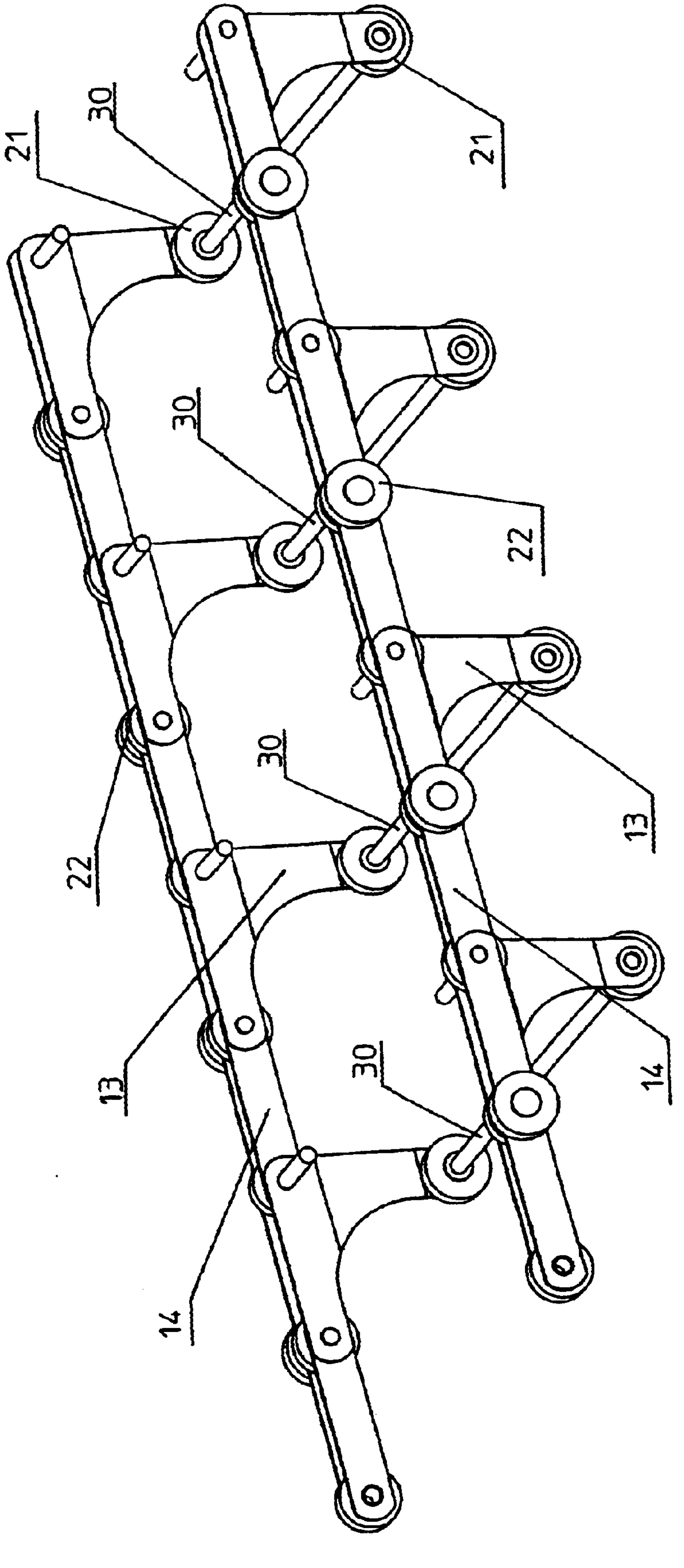
FIG. 16 shows a view in perspective a traction chain span, in accordance with another possible configuration, in the maximum speed portion.

FIG. 16 shows a solution in which the two treadboard side chains are joined by rods 30. In this embodiment, as that shown in FIGS. 4, 5 and 9, in the position of maximum chain extension, the straight links 14 are positioned in alignment with the adjacent section of the elbowed links 13.

Figure 17:
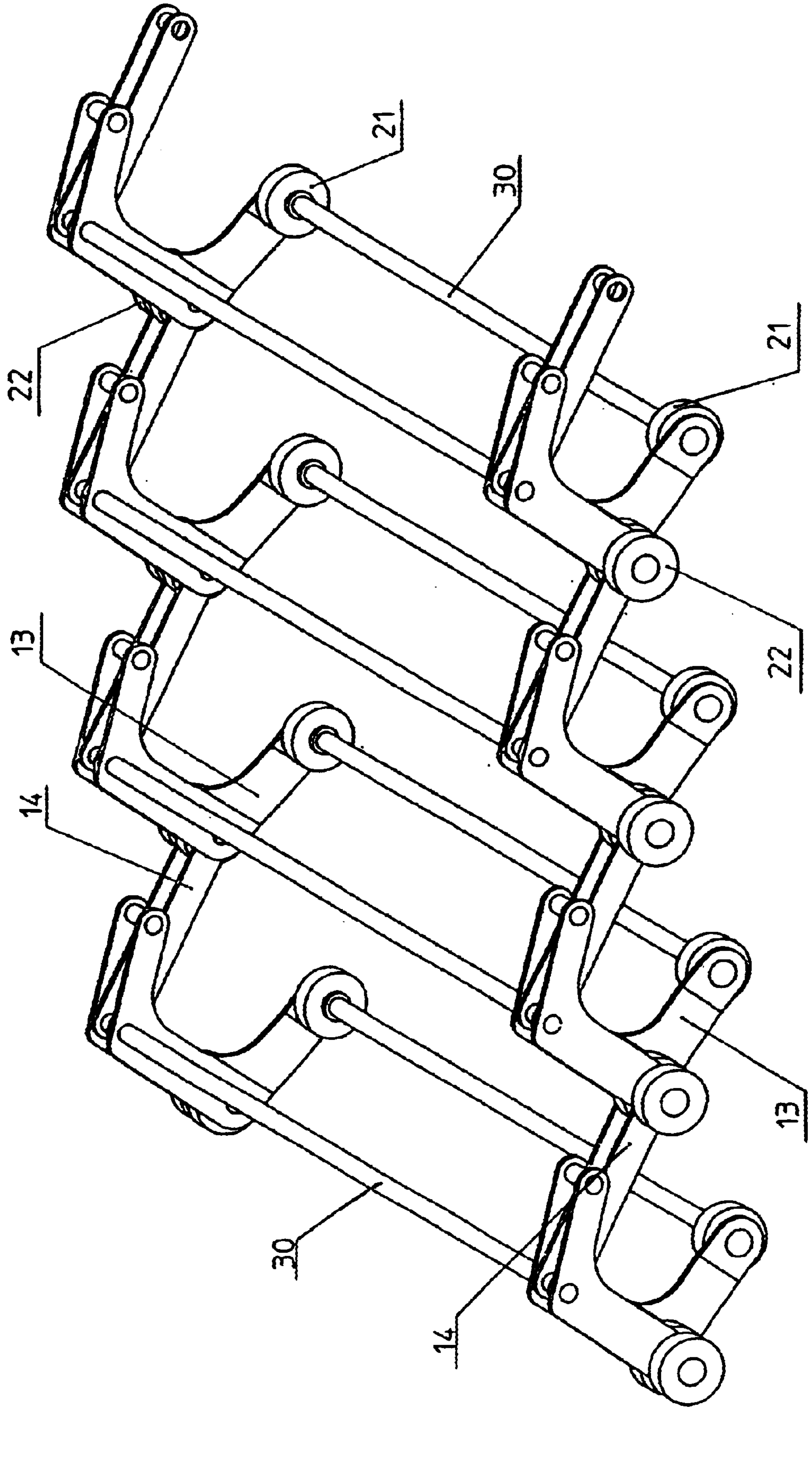
FIG. 17 shows a view in perspective a traction chain span, in accordance with another possible configuration, in the maximum speed portion.

FIG. 17 shows a solution similar to that of FIG. 16, in which the links are of different length. In this case, in the position of maximum chain extension, the straight links 14 are not aligned with the adjacent section of elbowed links 13.

Figure 18:
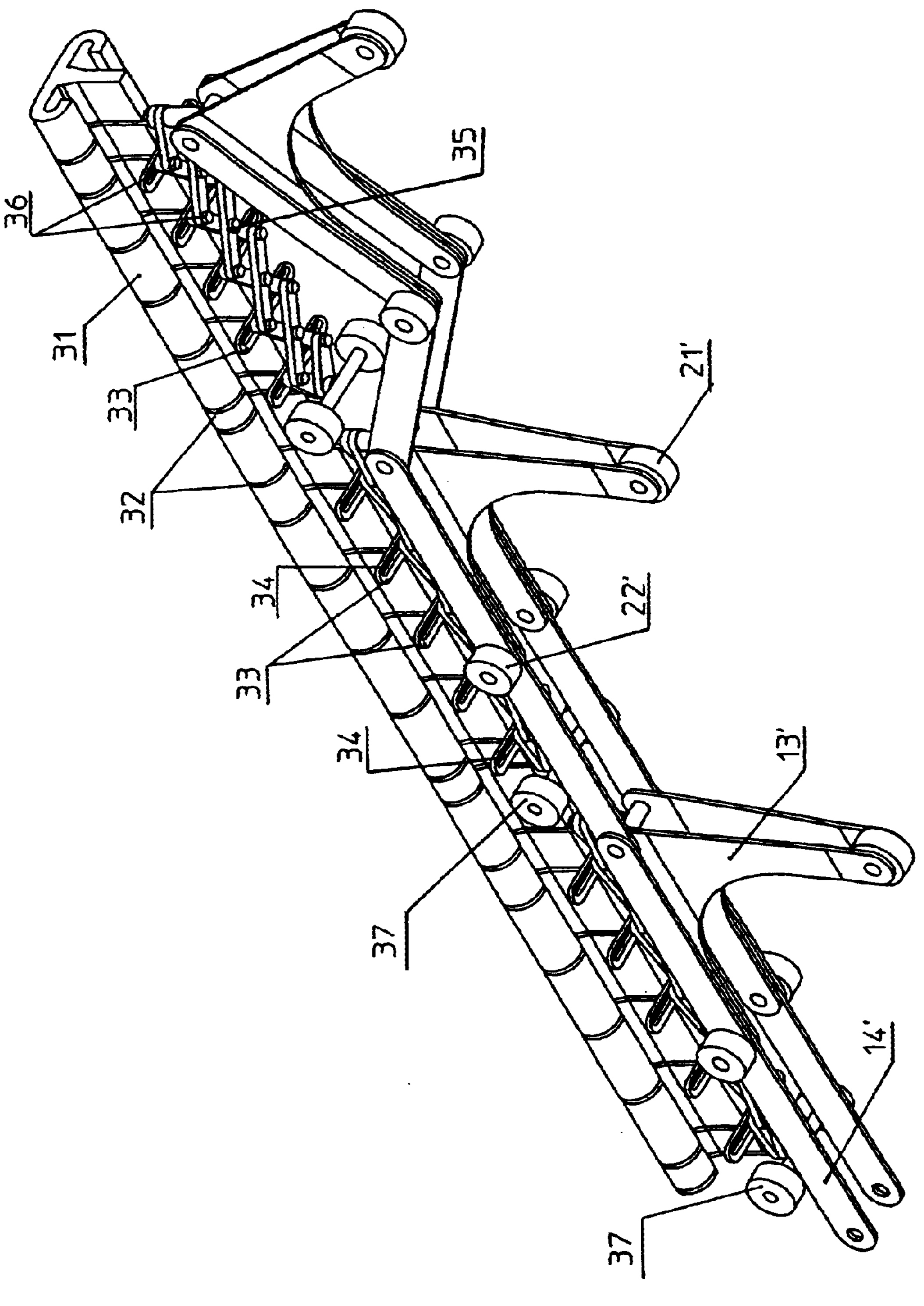
FIG. 18 shows a view in perspective in schematic form of the handrail of the accelerated walkway, in the maximum speed portion.

FIG. 18 shows a possible embodiment of a variable speed handrail, constituted by means of a succession of blocks or sections 31 of an elastomeric foam separated by platelets 32. These platelets 32 carry guides 33 on the underside, which determine a transversal groove 34, through which they are in relation with a pantograph 35, the outermost articulations 36 of which are housed in the slots 34 of the guides 33. Pantograph 35 is joined by means of the pillars 36 to a chain similar to that described for the movement of the treadboards, formed by elbowed links 13' and straight links 14' which incorporate rollers 21' and 22' which rest on guides in order to produce the folding and unfolding of the chains, as described above.

Each certain distance the blocks 31 of the handrail rest on some independent idlers 37 which serve as guiding elements for said handrail.

The platelets 32 prevent the deforming of the handrail outside its plane.

With the constitution described, the handrail suffers compression in the slow speed sections of the walkway and is elongated in the maximum speed sections, due to the chain made of links 13' and 14', in like manner to that described for the treadboards of the walkway.

A handrail such as that described would maintain its maximum length in the portion of maximum speed, and it would be compressed in the retarding portion. In the slow speed portions of entrance and exit, the handrail would be compressed. In the accelerating portion, the handrail would again be extended to its maximum length.

Figure 19:
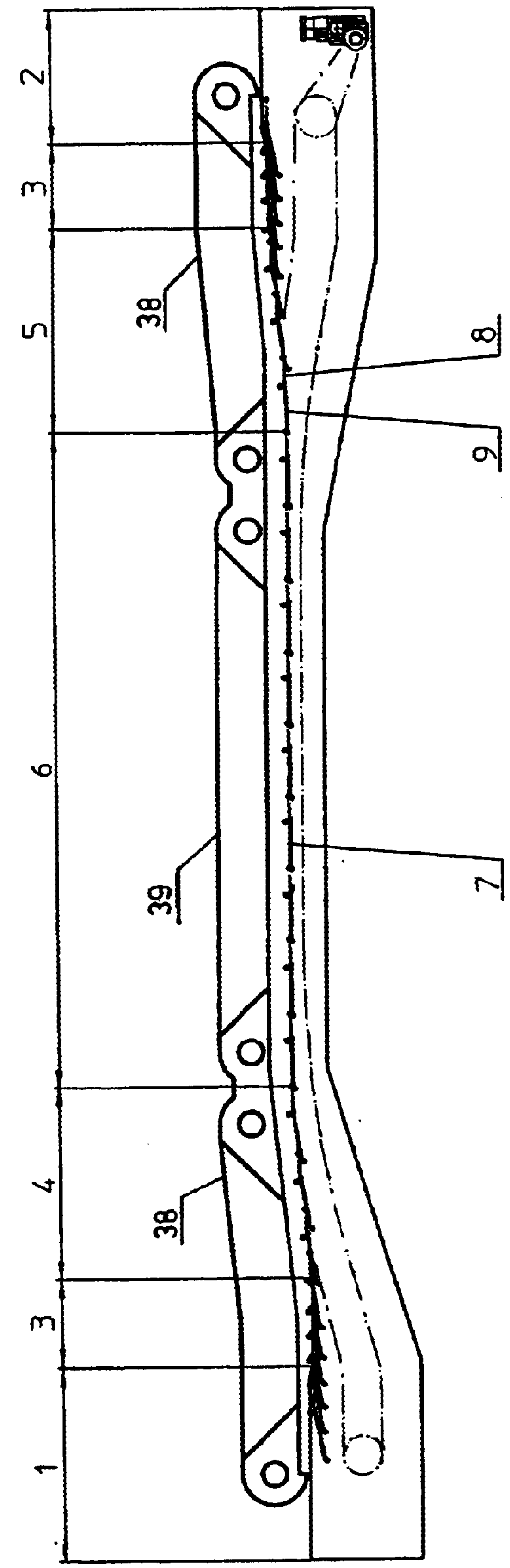
FIG. 19 shows a side view in schematic form of another possible solution for the handrail, making use of various conventional handrails at constant speed.

In FIG. 19, similar to that of FIG. 1, the solution that is shown is that of employing various continuous, endless handrails running at constant speed. The acceleration is produced by the difference in speeds of the different handrails. This solution, already known, can be likewise applied in this walkway. The number of handrails necessary depends on the difference reached in speeds of the slow portion and the fast portion.

In a variant of this solution, the handrails 38 of FIG. 19, can be of variable speed, as illustrated in FIG. 18. In that case, the handrail of the high speed portion 39 would the closed endless type, similar to the present constant, speed handrails.

What is claimed is:

1. An accelerated walkway, designed for conveying passengers or goods in a direction of movement, made up of sets of treadboards of variable length which are mounted between lateral traction chains, a drive mechanism being related with said lateral traction chains, each set of treadboards comprises a front treadboard and a rear treadboard, said front treadboard and said rear treadboard being grooved and mutually articulated along an axis perpendicular to the direction of movement; the rear treadboard of each set of treadboards is mounted on said lateral traction chains and on lateral guidance rails; the front treadboard of each set of treadboards rests on and is displaceable over the rear treadboard of a next set of treadboards in the direction of movement by means of guide elements; each of the lateral traction chains includes rigid elbowed links and straight links consecutively articulated to each other through their extremities and are run between lateral guides that cause said links to swivel between a folded position, in which the length of the chain is reduced, resulting in the partial overlaying of the treadboards, and a maximum extension position, resulting in the positioning of the treadboards in coplanar alignment.

2. The accelerated walkway in accordance with claim 1, wherein the swivelling of the links takes place in a progressive manner between a centre span of the lateral traction chains and outermost spans thereof, whereby a variation in speed is achieved of the displacement on the surface defined by the treadboards, said speed being maximum in the centre span and minimum in the outermost spans, between which an acceleration and retardation occurs in correspondence with an entrance portion and an exit portion of the chain, respectively.

3. The accelerated walkway in accordance with claim 1, wherein the lateral traction chains are comprised of elbowed links and straight links, each elbowed link having two straight segments, one of the straight segments of the elbowed links being articulated through its extremities with adjacent links, said adjacent links being straight or elbowed.

4. The accelerated walkway in accordance with claim 1, wherein the rear treadboard of each set of treadboards is fitted on each of its sides with longitudinal guides, with two rear coaxial rollers that form part of the lateral traction chains, and with front coaxial rollers which can move over the side guidance elements, and wherein the front treadboard of each set of treadboards has on each of the sides front coaxial sliding or rolling elements, which can move over the longitudinal guides of the rear treadboard corresponding to the following set of treadboards in the direction of movement.

5. The accelerated walkway in accordance with claim 1, wherein the elbowed links rest on the lateral guide rails through two rolling elements with axles perpendicular to the link.

6. The accelerated walkway in accordance with claim 1, wherein the front and rear treadboards of each set of treadboards have complementary adjacent edges which can be coupled to each other in the coplanar position of said treadboards.

7. The accelerated walkway in accordance with claim 1, wherein, in the centre portion, in which the lateral traction chains run in the maximum extension position, the treadboards of the different sets occupy coplanar positions, whilst in the outermost portions, in which the lateral traction chains run in the position of maximum folding, the rear treadboards of the different sets run under the front treadboards, these front treadboards being in a horizontal position, with the adjacent edges coupled to each other, coinciding in any position the axle of the rolling or sliding elements of these front treadboards with the line of intersection of the parallel planes equidistant from the respective walking surfaces of the front sub-treadboard and the adjacent rear one.

8. The accelerated walkway in accordance with claim 7, wherein, in transition spans, between portions of maximum extension and portions of maximum folding, the overlapping between front and rear treadboards varies progressively, the front treadboards being maintained in a noticeably horizontal position and the rear treadboards at a slight inclination, in opposition to the direction of movement.

9. The accelerated walkway in accordance with claim 1, wherein the traction chains engage at their outermost points with auxiliary pinions or chains that maintain the distance between the links and also facilitate the tilting of the treadboards between the forward-going and backward-going segment of the assembly.

10. The accelerated walkway in accordance with claim 9, wherein at least one of the auxiliary pinions or chains is in relation with the drive mechanism.

11. The accelerated walkway in accordance with claim 1, wherein, in the entrance and exit portions, the front treadboards of the sets of treadboards are moved in a coplanar and aligned manner, performing the transition with the fixed surface of the walkway by means of a system of combs.

* * * * *